US006692319B2

(12) United States Patent
Collier et al.

(10) Patent No.: US 6,692,319 B2
(45) Date of Patent: Feb. 17, 2004

(54) THRUSTER FOR SUBMARINE VESSELS

(75) Inventors: Gregory J. Collier, Davis, CA (US); William P. Klassen, Davis, CA (US)

(73) Assignee: Alstom Shilling Robotics, Davis, CA (US)

( * ) Notice: Subject to any disclaimer, the term of this patent is extended or adjusted under 35 U.S.C. 154(b) by 29 days.

(21) Appl. No.: 10/109,933

(22) Filed: Mar. 29, 2002

(65) Prior Publication Data

US 2003/0186601 A1 Oct. 2, 2003

(51) Int. Cl.$^7$ .................................................. B63H 1/18
(52) U.S. Cl. .......................................... 440/66; 440/38
(58) Field of Search ..................................... 440/66, 38

(56) References Cited

U.S. PATENT DOCUMENTS

| 5,219,434 A | | 6/1993 | Von Bergen et al. | ......... 277/23 |
| 5,333,444 A | * | 8/1994 | Meng | ........................ 60/221 |

FOREIGN PATENT DOCUMENTS

| DE | 688114 | 1/1990 | ....................... 65/3 |
| EP | 0 903 835 A1 | 3/1996 | ........... B63H/11/08 |
| EP | 1 122 165 A2 | 1/2001 | ........... B63H/11/08 |

OTHER PUBLICATIONS

Patentschrift Nr. 688 114.

* cited by examiner

Primary Examiner—Jesus D. Sotelo
(74) Attorney, Agent, or Firm—Sheppard, Mullin, Richter & Hampton LLP

(57) ABSTRACT

A thruster for use in underwater applications, including a stator assembly having an encapsulated set of coils and a rotor assembly having an encapsulated set of permanent magnets. Two ring-shaped rotor bearings, incorporating both thrust bearing surfaces and journal bearing surfaces, are mounted on the rotor assembly, for bearing engagement with corresponding bearing surfaces of ring-shaped bearing assemblies mounted on the stator assembly. The rotor bearings include radial grooves that form a centrifugal pump for drawing sea water through a filter assembly, which then directs the filtered water past the stator coils, for cooling, and past the bearing surfaces, for cooling and lubrication. The stator bearing assemblies are made up of a number of arc-shaped segmental bearings having specially configured cantilevered arms that facilitate the creation of a lubricating film of filtered sea water between the bearing surfaces. The rotor assembly has a shaftless configuration, with a ring-shaped rotor body with a set of inwardly projecting, symmetrically shaped blades.

17 Claims, 10 Drawing Sheets

THRUSTER FOR SUBMARINE VESSELS

BACKGROUND OF THE INVENTION

1. Field of the Invention

This invention relates generally to thrusters and, more particularly, to underwater thrusters for submarine vessels.

2. Description of the Related Art

Underwater drilling, research, searches, investigations, and similar operations commonly are performed using submarine vessels configured to travel thousands of feet below sea level. These submarine vessels include personnel operated vehicles (POVs) and remotely operated vehicles (ROVs). Both types of vehicles are propelled through the water using a propulsion system.

Modern underwater propulsion systems include a thruster having a magnetic flux generating stator, a shaftless propellant rotor, electrical conductors to supply electrical current to the thruster, and an electronic controller to regulate the electric current. The stator includes a plurality of magnetizable pole pieces, each associated with windings of conductive wires electrically connected to a power supply via the controller. The rotor includes a propeller ring containing a plurality of permanent magnets to be torqued by the magnetic flux from the stator pole pieces. The rotor further includes a plurality of propeller blades projecting inwardly from the propeller ring and a plurality of bearing assemblies connected to the propeller ring. The bearing assemblies are sealed and oil-filled, to lubricate the contact surfaces. Control of the rotor is accomplished by controlling the electrical current supplied to the stator windings. Nozzles are located on opposite sides of the rotor, surrounding the propeller blades, to improve the thruster's operating efficiency. An exemplary underwater propulsion system is described in U.S. Pat. No. 5,306,183, and an exemplary bearing assembly is described in U.S. Pat. No. 5,529,399.

Underwater propulsion systems of this type have several drawbacks. For example, most underwater propulsion systems have more than 100 moving parts, which can require substantial maintenance and service operations. In addition, underwater propulsion systems generally have sealed, oil-filled bearing assemblies that are vulnerable to seawater intrusion.

It should, therefore, be appreciated that there is a need for an underwater propulsion system or thruster that requires fewer moving parts and that eliminates the need for bearing assemblies having sealed, oil-filled bearing assemblies vulnerable to sea water intrusion. The present invention fulfills these and other needs.

SUMMARY OF THE INVENTION

The present invention is embodied in an improved underwater thruster having fewer moving parts than previous thrusters and eliminating the need for sealed bearing assemblies vulnerable to sea water intrusion. In particular, the thruster of the present invention includes a stator assembly having a ring-shaped stator body that encapsulates a plurality of coils and further having two ring-shaped stator bearing assemblies located on opposite sides of the stator body, encircling a circular opening. Each of the stator bearing assemblies has a journal bearing surface and a thrust bearing surface. The thruster further includes a rotor assembly having a ring-shaped rotor body that encapsulates a plurality of rotor magnets and further includes two ring-shaped rotor bearings, located on opposite sides of the ring-shaped body. Each of the rotor bearings has both a journal bearing surface and a thrust bearing surface for bearing engagement with the respective journal and thrust surfaces of the one of the two stator bearings. The rotor assembly further includes a plurality of propeller blades secured to the rotor body and arranged to project inwardly therefrom. A controller supplies electrical current to the coils of the stator assembly, to create a controlled electromagnetic field within the circular opening of the stator assembly, which interacts with the magnetic field of the rotor magnets, to cause the rotor assembly to rotate about a central axis.

In more detailed features of the invention, the thruster further includes a pump that directs filtered water past the stator bearings and the rotor bearings, to lubricate and cool the bearings and to cool the coils of the stator assembly. The pump preferably is a centrifugal pump that includes a plurality of radially oriented grooves formed in a planar wall of each of the two rotor bearings, for slinging water radially outwardly when the rotor assembly is rotated about the central axis. The pump further includes a plurality of holes formed through the planar wall of each of the two rotor bearings, each such hole being aligned with a separate one of the plurality of grooves, for directing water to the grooves. The pump provides suction that draws unfiltered sea water through a filter located adjacent to a water inlet formed in the stator body. A flapper valve is located downstream of the pump, for preventing the intrusion of unfiltered sea water into the region of the stator bearings and rotor bearings when the rotor assembly is not rotating.

In other more detailed features of the invention, the stator bearing assembly includes a plurality of arc-shaped segmental bearings positioned end-to-end to form a ring shape. Each segmental bearing includes a journal bearing segment that defines the journal bearing surface and a thrust bearing segment that defines the thrust bearing surface. Further, the thrust bearing segment of each segmental bearing includes a post that projects radially outward from a mid-portion of the journal bearing segment and two arms cantilevered laterally from the post. A radial recess is formed in the portion of the thrust bearing surface defined by each cantilevered arm of each segmental bearing. Each of the plurality of arc-shaped segmental bearings is formed of a plastic material, as a unitary component.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

An embodiment of the present invention will now be described, by way of example only, with reference to the following drawings in which.

DESCRIPTION OF THE PREFERRED EMBODIMENT

Figure 1:
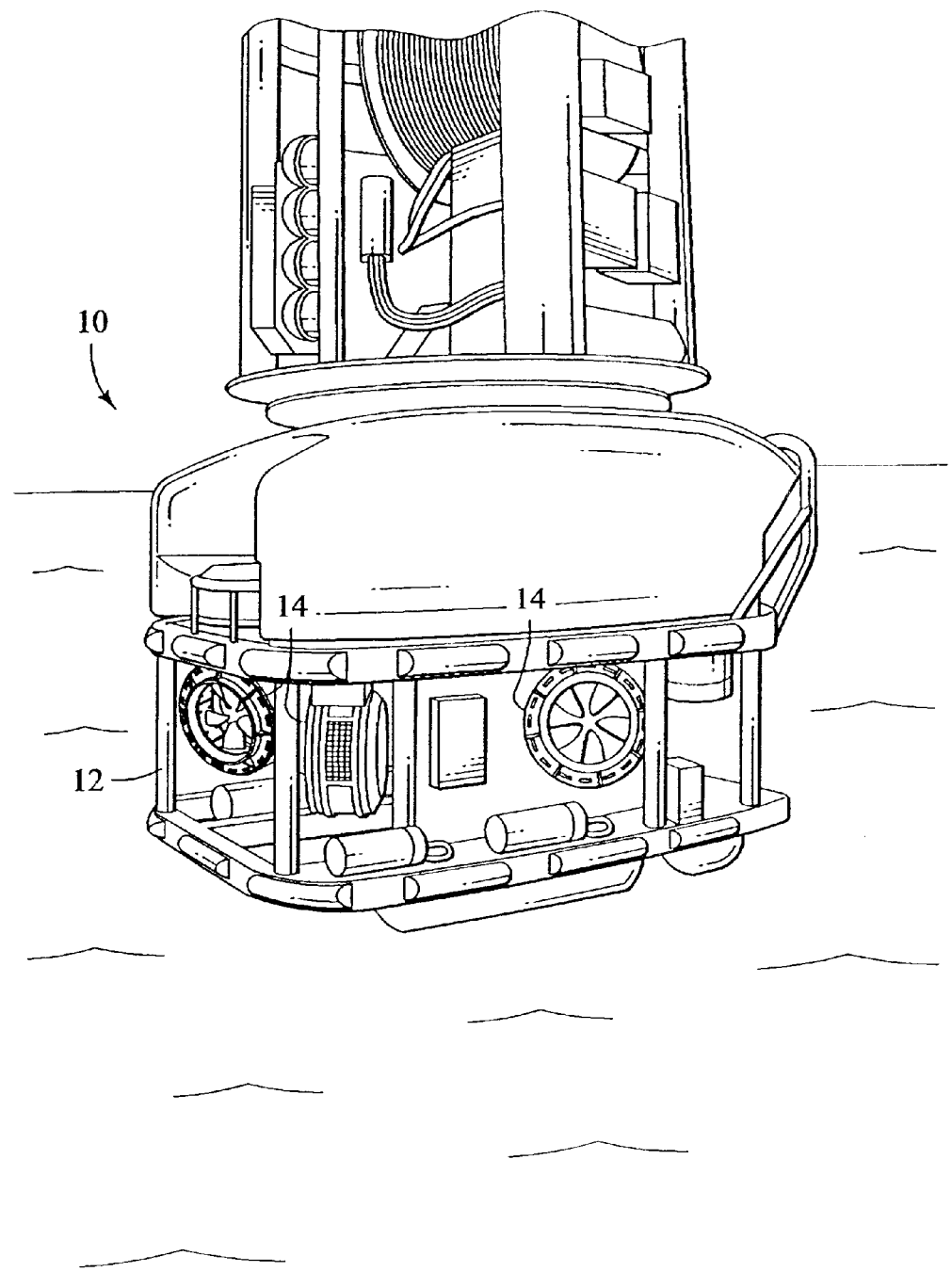
FIG. 1 is a perspective view of a submarine vessel having a body that supports a plurality of thrusters positioned along orthogonal axes.
Figure 2:
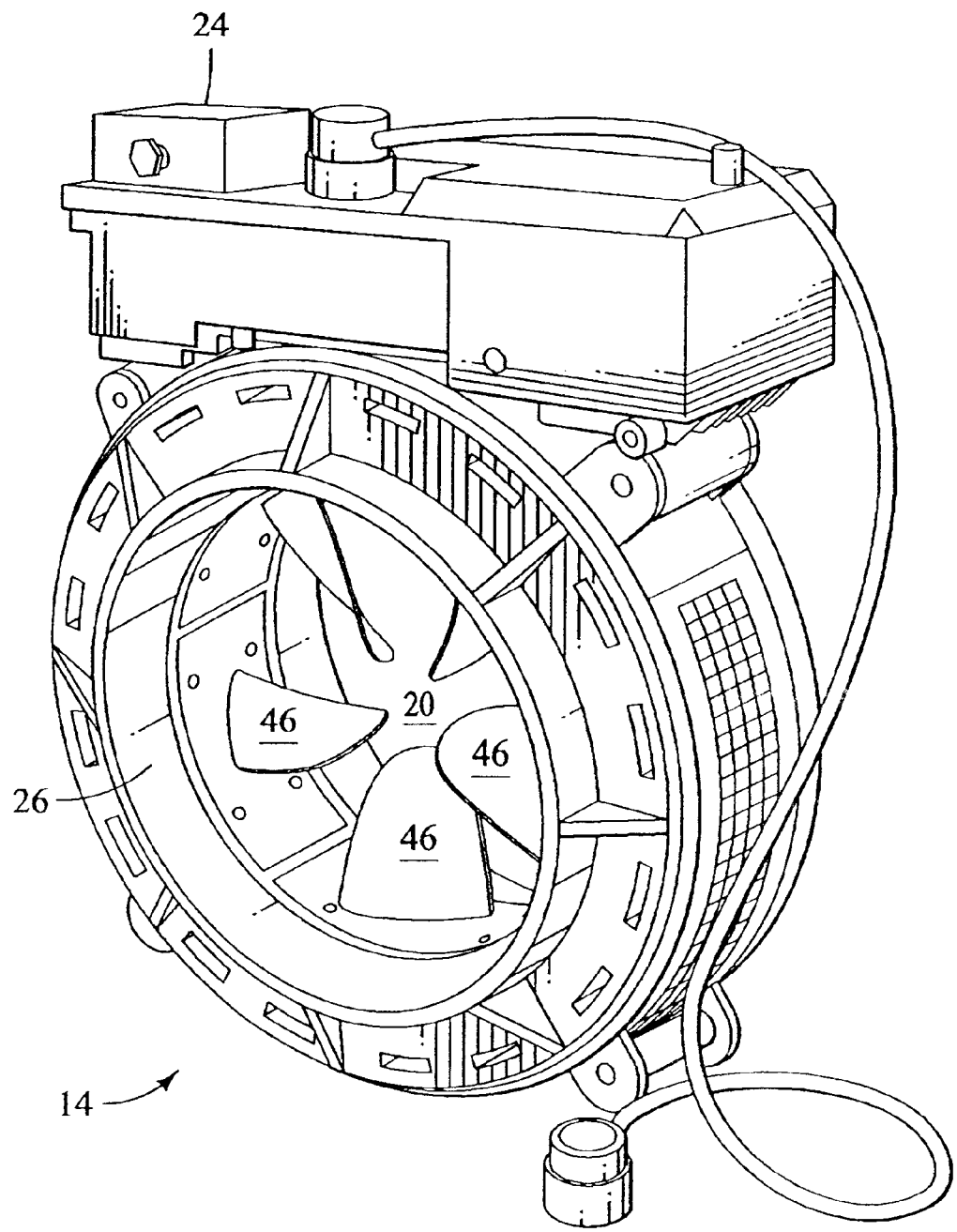
FIG. 2 is a perspective view of one of the thrusters of FIG. 1.
Figure 3:
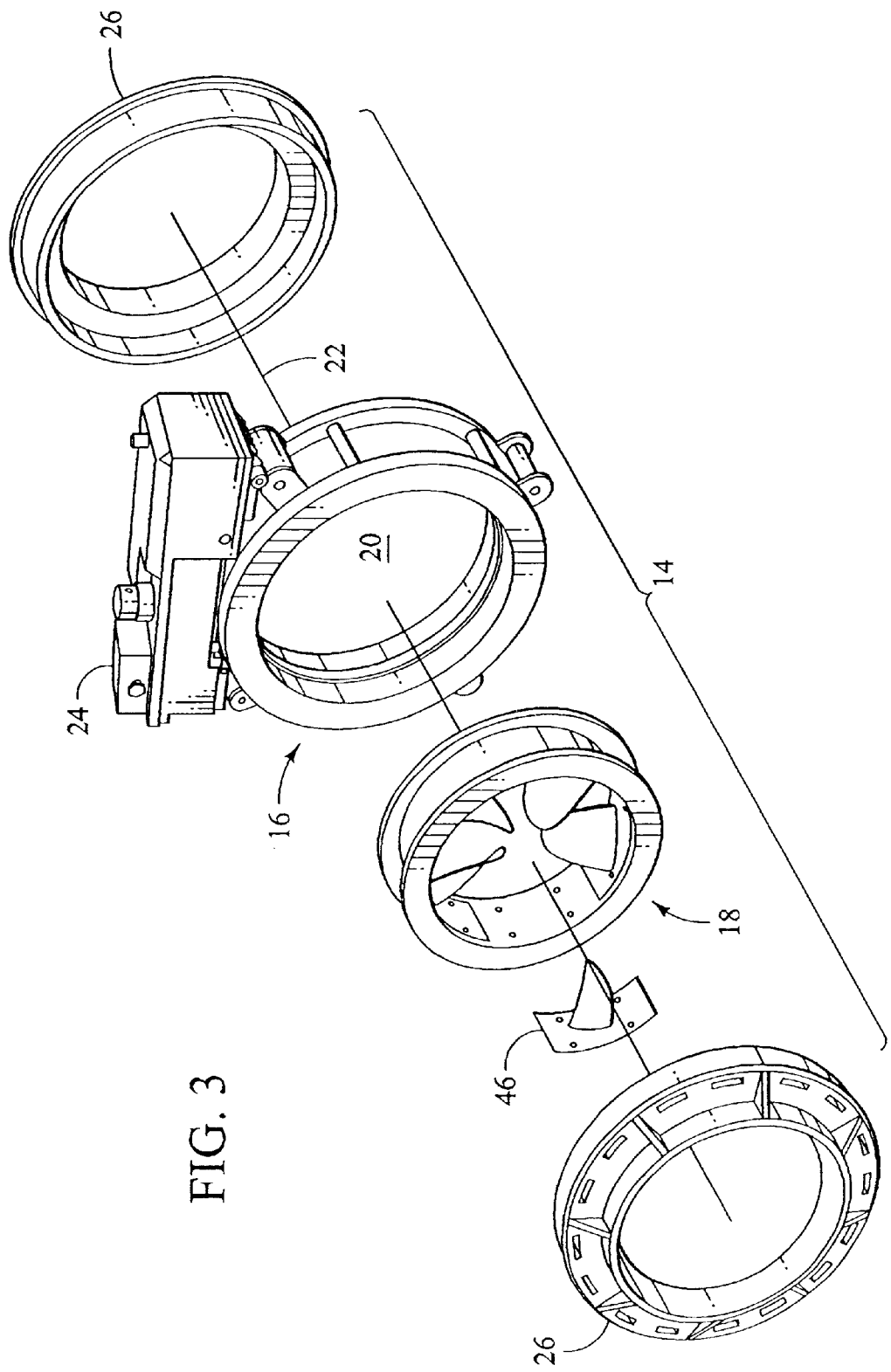
FIG. 3 is an exploded perspective view of some components of the thruster of FIG. 2.
Figure 4:
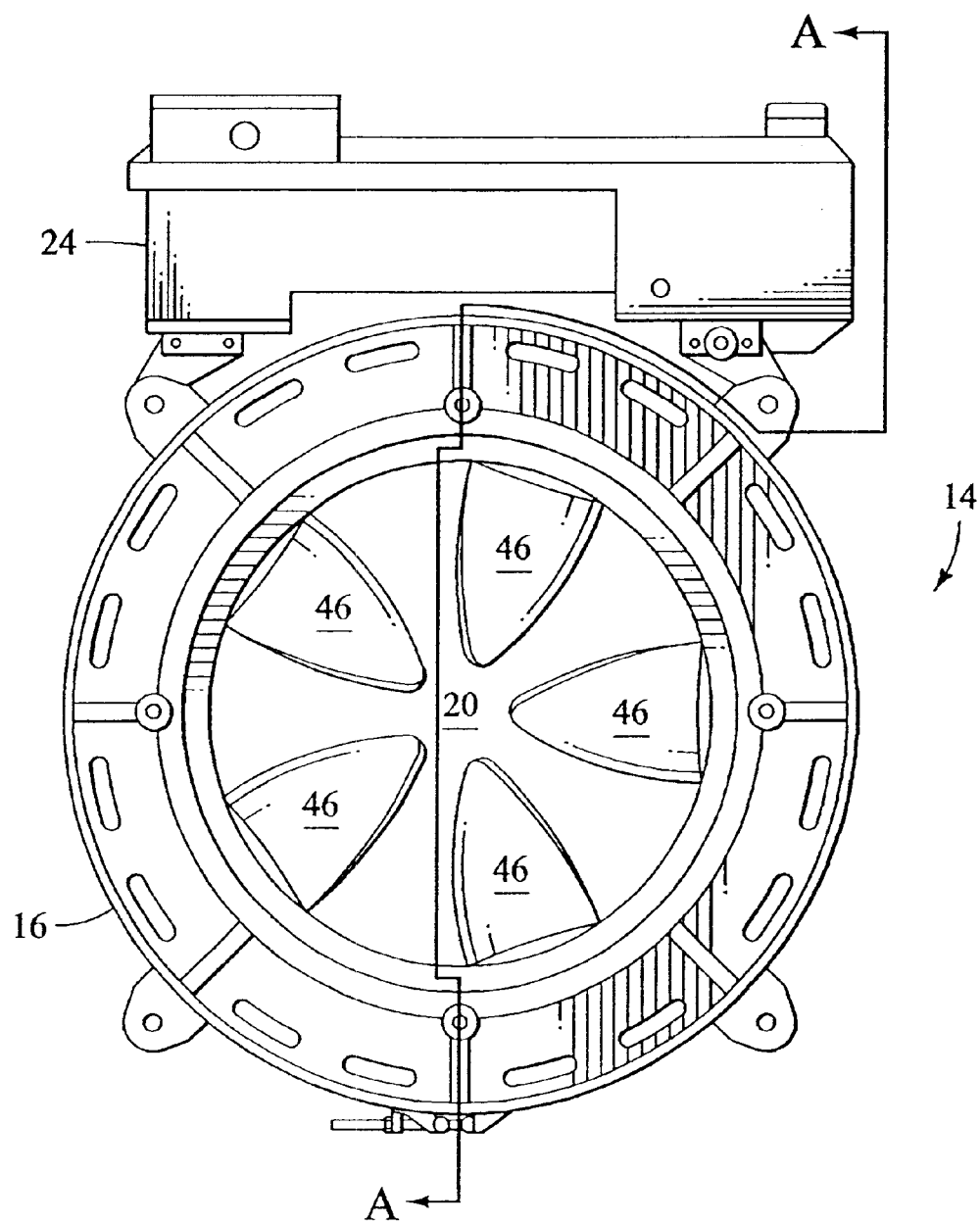
FIG. 4 is a front elevational view of the thruster of FIG. 2.
Figure 5:
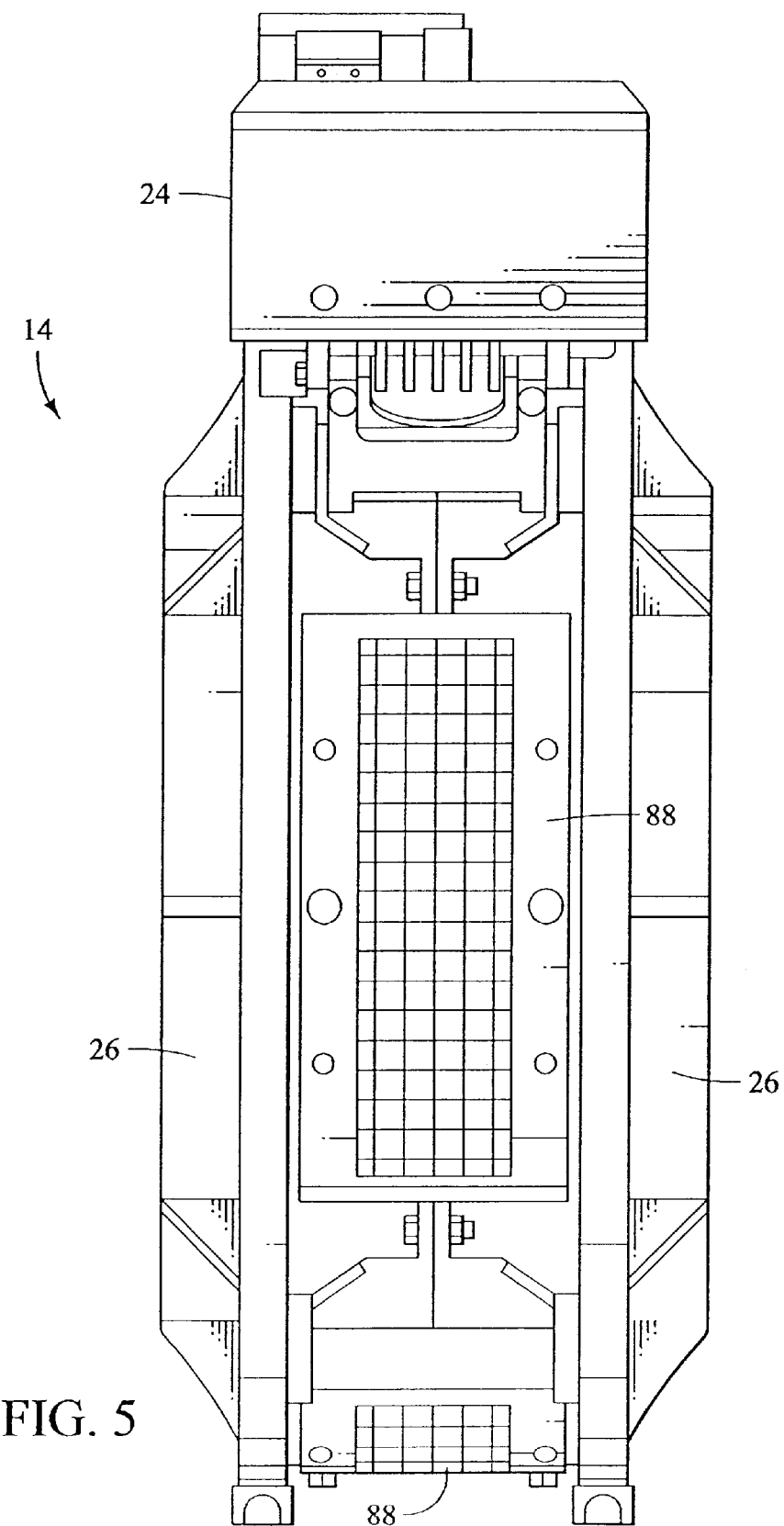
FIG. 5 is a right side elevational view of the thruster of FIG. 2.
Figure 6:
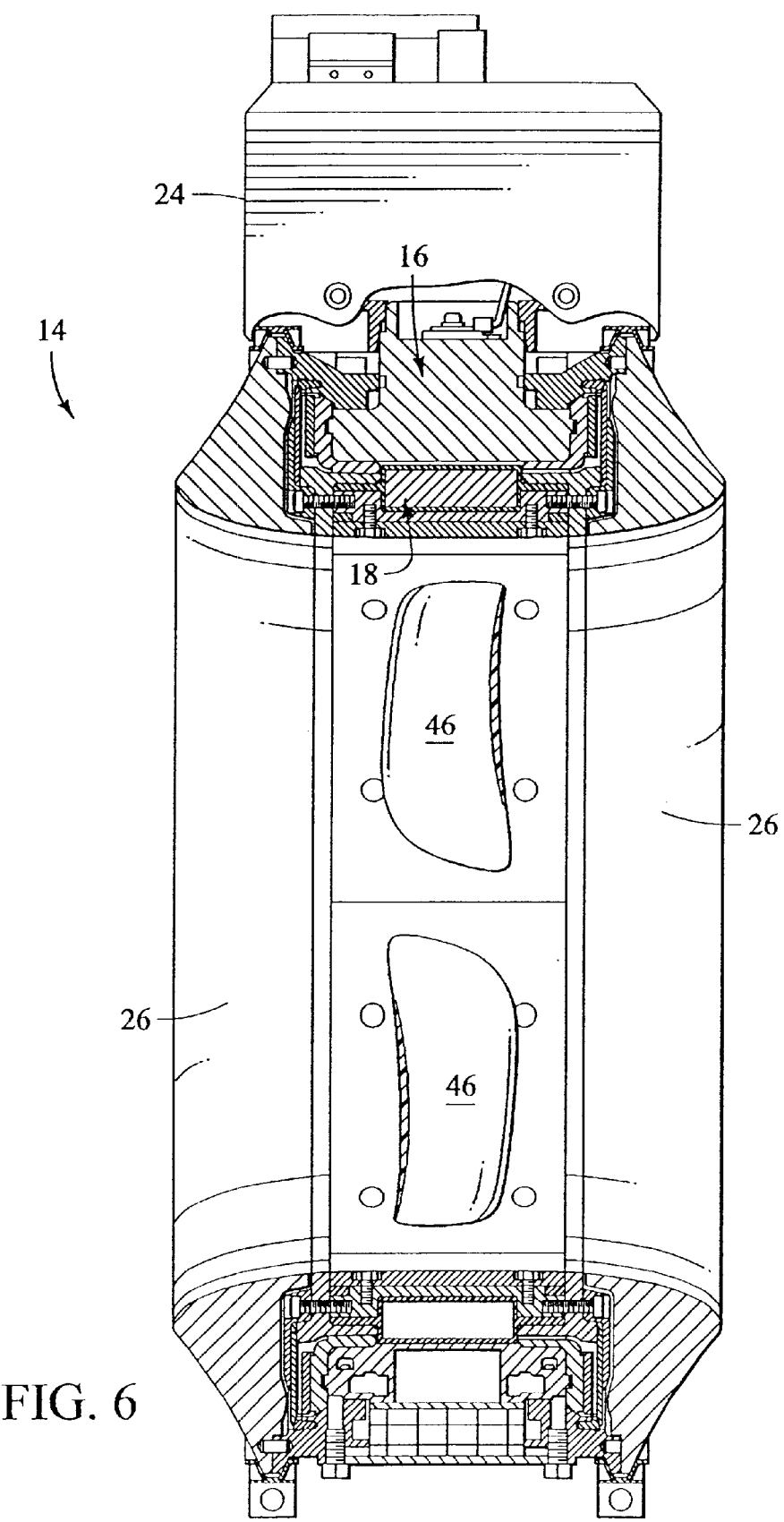
FIG. 6 is a cross-sectional view of the thruster of FIG. 2, taken the direction of the arrows A—A in FIG. 4.

With reference now to the illustrative drawings, and particularly to FIG. 1, there is shown a submarine vessel 10 having a body 12 that mounts seven thrusters 14 oriented along orthogonal axes. Each thruster is a low-speed, high-efficiency, high-torque device configured to operate in a deep-sea environment. Each thruster is configured to provide a controlled thrust in either of two opposing directions, whereby the thrusters can be controlled to cooperate to move the vessel in any desired direction.

As shown in FIGS. 2–6, each thruster 14 includes a stator assembly 16 securely fastened to the vessel body 12 and a shaftless rotor assembly 18 located within a central circular opening 20 defined by the stator assembly. The rotor assembly is configured to rotate in either of two opposing directions, about a central axis 22. A motor controller 24 is attached to the stator assembly, for regulating the amount of electrical current supplied to the stator assembly and thereby controlling the thruster's functionality and operation, e.g., the speed and direction of rotation of the rotor assembly. Nozzle assemblies 26 are mounted at the stator's opposite ends, encircling the circular opening and rotor assembly, to improve the efficiency of the flow of sea water through the thruster.

More particularly, the stator assembly 16 includes a laminated, ring-shaped stator body 28 that encapsulates a plurality of poles (not shown) spaced uniformly around the body's circumference. A coil (not shown) is wound around each pole. The poles and coils are sized such that adjacent coils are spaced apart from each other. The poles and coils are encapsulated using a suitable thermally conductive plastic material, to prevent the intrusion of sea water and to eliminate air pockets that would require pressure compensation. The stator body is secured to the body 12 of the submarine vessel 10 by suitable fasteners (not shown).

The stator assembly 16 further includes two ring-shaped stator bearing assemblies 30. Each such assembly includes twelve arc-shaped, segmented bearings 32 arranged end-to-end and spaced uniformly around the stator body's circumference. The two stator bearing assemblies are located on opposite sides of the stator body, encircling the central circular opening 20.

The rotor assembly 18 includes a ring-shaped rotor body 34 that encapsulates a plurality of permanent magnets 36 located radially outward of a ring-shaped back iron 38. The magnets and back iron are encapsulated within a suitable plastic material, to prevent the intrusion of sea water and to eliminate volumes that would require pressure compensation. Two ring-shaped rotor bearings 40 are located on opposite sides of the rotor body. These bearings are configured for bearing engagement with the two ring-shaped stator bearing assemblies 30. The rotor bearings are secured to the rotor body by bolts 42, which extend through holes 43. An O-ring 44 is located between each rotor bearing and the rotor body, to prevent the intrusion of unfiltered sea water into the region between the rotor bearings and the stator bearing assemblies.

The rotor assembly 18 further includes five propeller blades 46 removably secured to a radially inward-facing surface of the rotor body 34. The blades preferably are formed of glass fiber-reinforced plastic, and they are spaced uniformly along the rotor body's inner circumference. Each blade is attached to the rotor body by a set of hex bolts 48, which allows individual replacement without requiring disassembly of the thruster. The blades are configured symmetrically, which enables the thruster to provide equal thrust in either of the two opposing directions.

When the motor controller 24 supplies an electrical current to the stator coils, an electromagnetic field is developed radially inward of the stator assembly 16, in the circular opening 20, at the site of the rotor assembly 18. This electromagnetic field interacts with the magnetic field of the permanent magnets 36 of the rotor assembly, to rotatably drive the rotor assembly.

Each of the two ring-shaped stator bearing assemblies 30 includes a journal bearing surface 50 and a thrust bearing surface 52, which are configured for bearing engagement a respective journal bearing surface 54 and thrust bearing surface 56 of the counterpart rotor bearing 40. This engagement retains the rotor assembly 18 for controlled rotation within the circular opening 20 defined by the stator assembly 16. Lubrication and cooling of the bearing surfaces is provided by filtered sea water, as will be described below.

Figure 7:
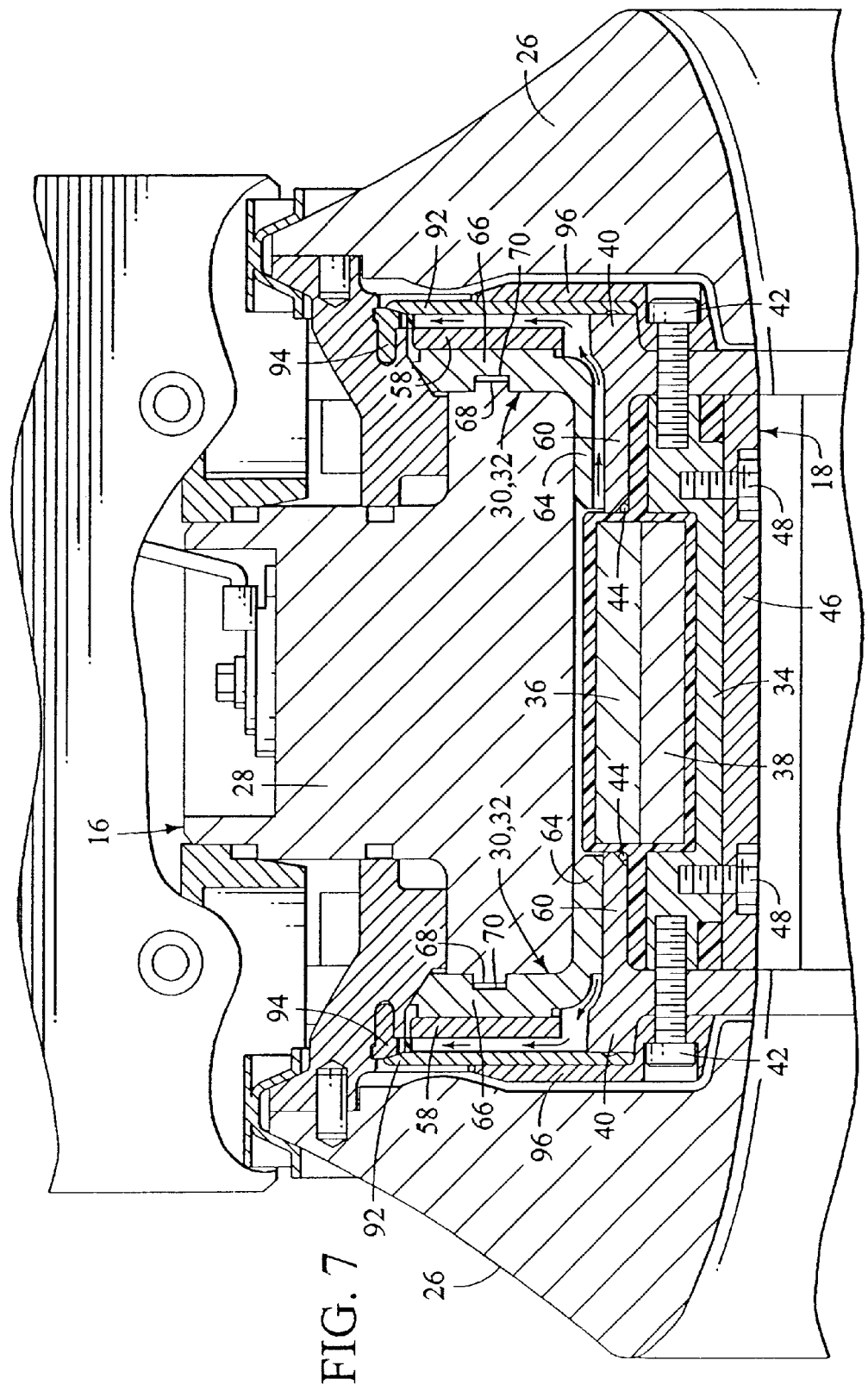
FIG. 7 is an enlarged cross-sectional view of a segment of the thruster of FIG. 2, taken in the direction of the arrows A—A in FIG. 4.
Figure 8:
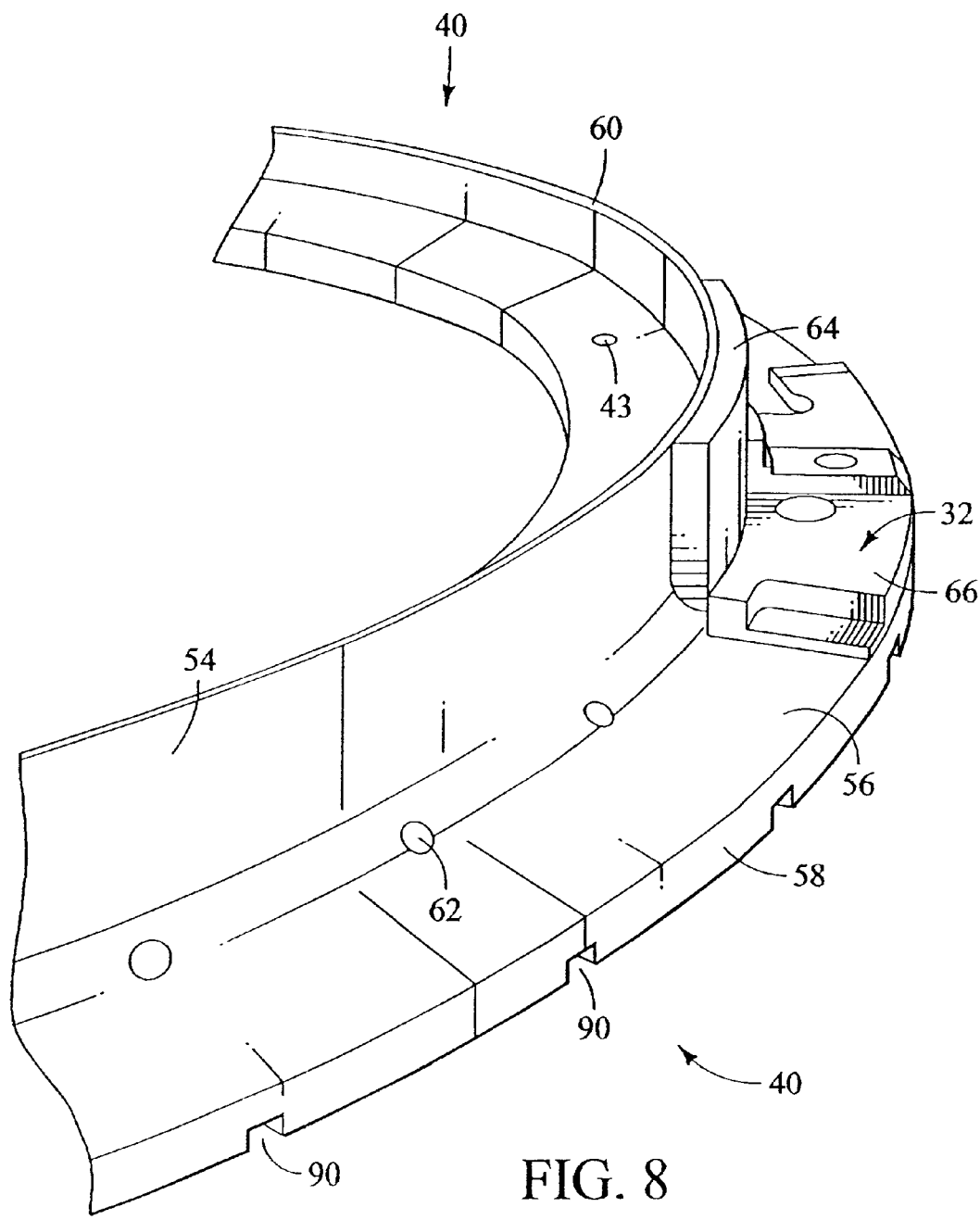
FIG. 8 is a fragmentary perspective view of one of two ring-shaped rotor bearings that are part of the rotor assembly of the thruster of FIG. 2, the bearing being shown with one of twelve segmental bearings.
Figure 9:
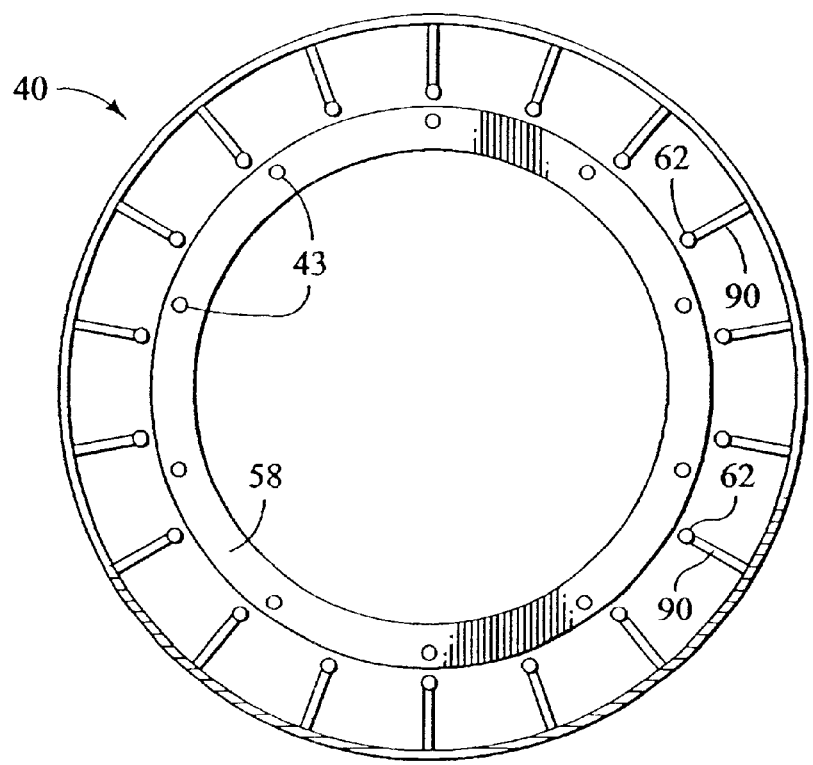
FIG. 9 is a rear view of the rotor bearing of FIG. 8.
Figure 10:
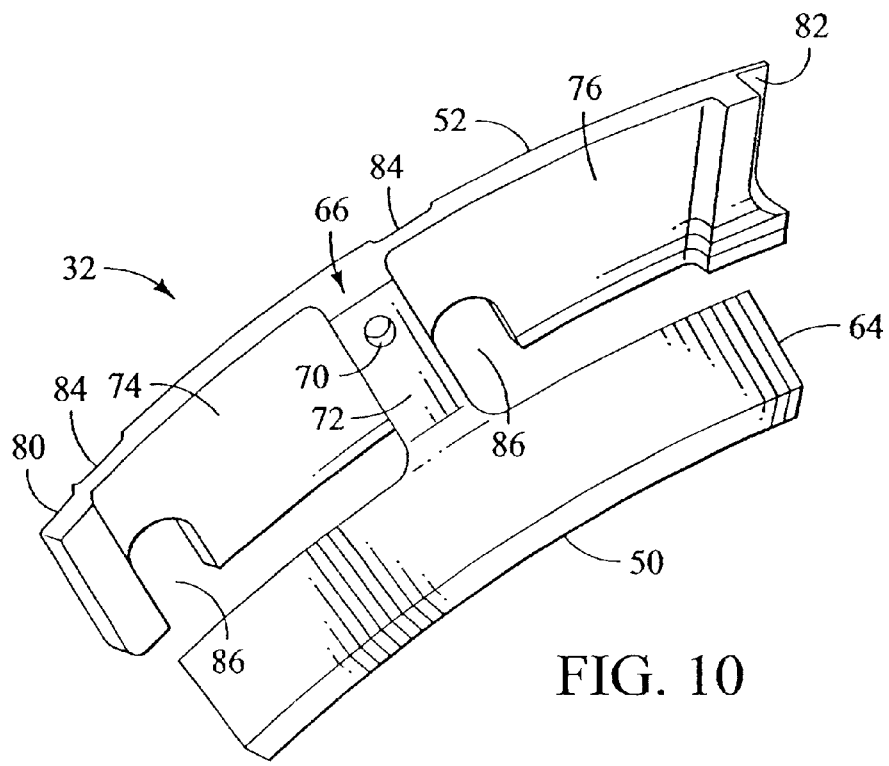
FIG. 10 is a rear perspective view of one of twelve segmental bearings that form each of two ring-shaped stator bearing assemblies that engage the two rotor bearings of FIG. 8.

As shown in FIGS. 7 and 8, each of the two ring-shaped rotor bearings 40 includes a radially oriented planar ring 58 and an integral cylindrical collar 60 projecting perpendicularly from the planar ring. The radially outward side of the collar defines the journal bearing surface 54, and the side of the planar ring adjacent to, and radially outward of, the collar defines the thrust bearing surface 56. A series of holes 62 extends through the planar ring, where it transitions between the journal bearing surface and the thrust bearing surface, for directing filtered sea water past the bearing surfaces, as will be described below. In the preferred embodiment, the rotor bearing's planar ring has an inner radius $R_i$ of about 15 cm and an outer radius $R_o$ of about 21 cm, and the rotor bearing's collar has an inner radius $R_o$ of about 17.5 cm.

FIGS. 10–13 depict one of the twelve segmented bearings 32 that make up each of the two ring-shaped stator bearing assemblies 30. The segmented bearing includes a journal bearing segment 64 defining the journal bearing surface 50 and further includes a thrust bearing segment 66 defining the thrust bearing surface 52. The journal bearing surface faces radially inwardly toward the thruster's central axis 22, and the thrust bearing surface faces in a direction parallel with the thruster's central axis. The two segments are formed together as an integral component, of a suitable low-friction, durable plastic material. Cylindrical projections 68 formed in the stator body 28 are sized and configured to nest in recesses 70 formed in the segmented bearings, to retain the segmented bearings in place. The segmented bearings thereby cooperate to form the stator bearing assembly's ring shape.

The journal bearing segment 64 of each arc-shaped segmented bearing 32 has a uniform curvature extending over about 30° of arc. The segment also has a substantially uniform thickness. The radius of the journal bearing surface 50 is slightly larger than the radius of the journal bearing surface 54 of the rotor bearing 40 (FIG. 8). This radius differential creates a gap (e.g., sized about 0.01 mm) at the edges of the journal bearing segment, which ensures that the lubricating sea water can enter the space between the two bearing surfaces, regardless of the rotor assembly's direction of rotation.

The thrust bearing segment 66 of each segmented bearing 32 is formed by a post 72 that projects radially outward from a mid-portion of the journal bearing segment 64. Cantilevered laterally from the post are two arms 74 and 76, which combine to form the thrust bearing surface 52. This cantilevered configuration allows the arms to flex away from the opposing thrust bearing surface 56 of the rotor bearing 40, which facilitates the creation of a lubricating hydrodynamic film of sea water between the two surfaces. The arms have thickness profiles configured to provide the desired degree of flexing. This enables the thrust bearing segment to be formed of a low-cost plastic material and obviates the need for precise machining.

The back sides of the two cantilevered arms 74 and 76 of the thrust bearing segment 66 of each segmented bearing 32 are supported against the stator body 28. This prevents the arms from flexing excessively away from the rotor bearing 40. The segmented bearing is made from a suitable strong, durable, and flexible plastic material. Advantageously, the remote ends of the arms are specially configured to nest with the ends of the arms of the two adjacent segmented bearings. In particular, the remote end of the arm 74 includes a cut-out 80 on its rear side, and the remote end of the arm 76 includes a recessed finger 82. The finger is sized and shaped to nest within the cutout of the adjacent segmented bearing. In this manner, the thrust bearing surfaces of the twelve segmented bearings provide a full 360° arc.

Figure 11:
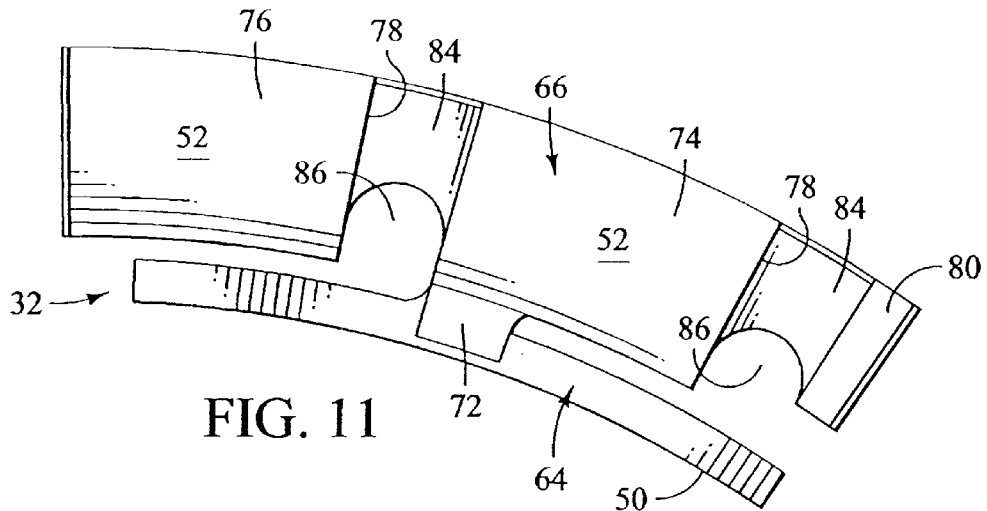
FIG. 11 is a front view of the segmental bearing of FIG. 10.
Figure 12:
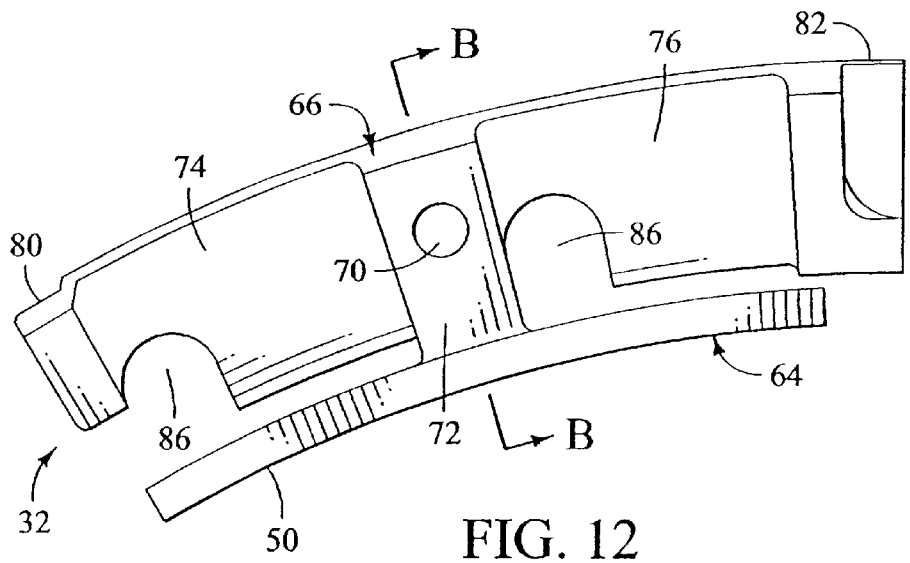
FIG. 12 is a rear view of the segmental bearing of FIG. 10.
Figure 13:
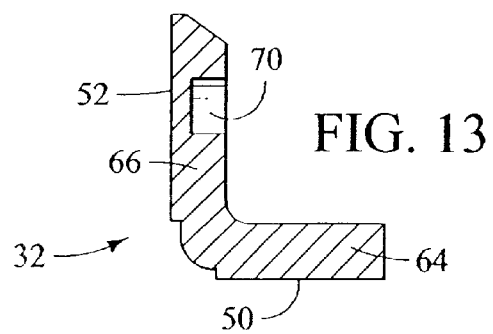
FIG. 13 is a cross-sectional view of the bearing of FIG. 10, taken in the direction of the arrows B—B in FIG. 12.

With particular reference to FIG. 11, the thrust bearing surface or pad 52 of each segmented bearing 32 is shown to include two shallow recesses 84 extending radially across the entire surface. Arc-shaped openings 86 at the ends of the recesses adjacent to the journal bearing segment 64 allow lubricating sea water to enter and flow through the recesses. A 45° chamfer 87 at the edges of each of the two shallow recesses 84 helps to facilitate the creation of a lubricating hydrodynamic film of sea water adjacent to the thrust bearing pad 52.

The thruster 14 further includes a centrifugal pump that draws in sea water through an associated filter assembly 88 and then directs the filtered water past the rotor bearings 40, the stator bearing assemblies 30, and the stator body 28. This cools and lubricates the bearings, and it cools the stator coils.

The centrifugal pump advantageously is integrated with the rotor bearings 40 themselves. In particular, the pump takes the simple form of a set of radial grooves 90 formed in the planar ring 58 of each bearing, on the side of the ring opposite the ring's thrust bearing surface 56. These grooves function to sling sea water radially outward when the rotor assembly 18 and ring are rotated. The filter assembly 88 is located at each of several inlets for the sea water (FIGS. 2 and 5), and it incorporates finely woven fibers (10 microns) for trapping small particulates and preventing such particulates from reaching the bearings. The particulate is trapped on the filter's surface, so it readily can be sprayed off.

As shown in FIG. 7, an anti-reversal seal 92 is located adjacent to each rotor bearing 40, for preventing unfiltered sea water from reaching the bearings when sea water is not being pumped. The seal preferably takes the form of a bendable flap, which allows water to pass in one direction, by bending out of the way, but not to pass in the opposite direction, by pressing against an opposing sealing surface 94. The bendable flap is retained in position by a ring-shaped plate 96 covering its inner portion. This plate, in turn, is secured to the rotor assembly 18 by the same bolts 42 as secure the rotor bearing 40.

In operation, when the rotor assembly 18 is rotating within the stator assembly 16, sea water located in the radial grooves 90 of each rotor bearing 40 is slung radially outward and past the flapper valve 92, which yieldably bends away. This draws sea water in through the filter assembly 88 which filters the water and directs it on to the two stator bearing assemblies 30 and the two rotor bearings. The filtered sea water is directed to flow into the space between the journal bearing surfaces 50 and 54 and into the space between the thrust bearing surfaces 52 and 56, and in turn through the holes 62 formed in the rotor bearing to reach the radial grooves.

The motor controller 24 receives an electrical input of 600 volts dc, and the thruster 14 consumes up to about 7.5 kilowatts of power, producing a peak thrust of about 200 kilogram-meters and a maximum speed of about 1000 rpm. The motor controller also is configured to automatically shut down the thruster when potentially damaging conditions occur, e.g., over-currents caused by fouling or other mechanical problems. The motor controller has a serial port for transmitting and receiving data from a remote control system. The transmitted data includes, e.g., information regarding thruster operation and status.

It should be appreciated from the foregoing description that the present invention provides an effective thruster for use in underwater applications. The thruster includes a stator assembly having an encapsulated set of coils and a rotor assembly having an encapsulated set of permanent magnets. Two ring-shaped rotor bearings, incorporating both thrust bearing surfaces and journal bearing surfaces, are mounted on the rotor assembly, for bearing engagement with corresponding bearing surfaces of two ring-shaped bearing assemblies mounted on the stator assembly. The rotor bearings include radial grooves that form a centrifugal pump for drawing sea water through a filter assembly, which then directs the filtered water past the stator coils, for cooling, and past the bearing surfaces, for cooling and lubrication. The stator bearing assemblies are made up of a number of arc-shaped segmental bearings having specially configured cantilevered arms that facilitate the creation of a lubricating film of filtered sea water between the bearing surfaces. The rotor assembly has a shaftless configuration, with a ring-shaped rotor body with a set of inwardly projecting, symmetrically shaped blades.

Although the invention has been described in particular with reference only to the preferred embodiment, it will be apparent to those skilled in the art that various modifications can be made without departing from the spirit and scope of the invention. Accordingly, the invention is defined only by the following claims.

We claim:

1. A thruster for a submarine vessel comprising:
   (a) a stator assembly including
      (1) a ring-shaped stator body encapsulating a plurality of coils, wherein the body defines a circular opening having a central axis, and wherein the coils are configured to create a variable electromagnetic field within the circular opening, and
      (2) first and second ring-shaped stator bearings located on opposite sides of the stator body, encircling the circular opening, wherein each of the stator bearings has a journal bearing surface and a thrust bearing surface;
   (b) a rotor assembly including
      (1) a ring-shaped rotor body encapsulating a plurality of rotor magnets and located within the circular opening defined by the stator body, wherein the rotor magnets are configured to create a magnetic field,
      (2) a plurality of propeller blades secured to the rotor body and arranged to project inwardly therefrom, and
      (3) first and second ring-shaped rotor bearings located on opposite sides of the ring-shaped body, wherein each of the rotor bearings has journal and thrust bearing surfaces configured for bearing engagement with the respective journal and thrust bearing surfaces of a corresponding one of the first and second stator bearings; and (c) a controller for supplying electrical current to the coils of the stator assembly, to create a controlled electromagnetic field within the circular opening of the stator assembly, which interacts with the magnetic field of the rotor magnets, to cause the rotor assembly to rotate about the central axis.

2. A thruster as defined in claim 1, and further comprising a pump that directs filtered water past the stator bearings and the rotor bearings, to lubricate and cool the bearings and the to cool the coils of the stator assembly.

3. A thruster as defined in claim 2, wherein:

each of the first and second rotor bearings includes planar wall oriented substantially perpendicular to the central axis; and the pump is a centrifugal pump that includes a plurality of radially oriented grooves formed in the planar wall of each of the first and second rotor bearings, for slinging water radially outwardly when the rotor assembly is rotated about the central axis.

4. A thruster as defined in claim 3, wherein the pump further includes a plurality of holes formed through the planar wall of each of the first and second rotor bearings, each such hole being aligned with a separate one of the plurality of grooves, for directing water to the grooves.

5. A thruster as defined in claim 2, wherein:

the pump provides suction that draws unfiltered sea water through a water inlet formed in the stator body; and the thruster further comprises a filter located between the water inlet and the pump.

6. A thruster as defined in claim 5, and further comprising a flapper valve located downstream of the pump, for preventing the intrusion of unfiltered sea water into the region of the stator bearings and rotor bearings when the rotor assembly is not rotating.

7. A thruster as defined in claim 1, wherein the stator bearing assembly includes a plurality of arc-shaped segmental bearings positioned end-to-end to form a ring shape.

8. A thruster as defined in claim 7, wherein:

the each segmental bearing includes a journal bearing segment that defines the journal bearing surface and a thrust bearing segment that defines the thrust bearing surface; and the thrust bearing segment of each segmental bearing includes a post that projects radially outward from a mid-portion of the journal bearing segment and two arms cantilevered laterally from the post.

9. A thruster as defined in claim 8, wherein a radial recess is formed in the portion of the thrust bearing surface defined by each cantilevered arm of each segmental bearing.

10. A bearing assembly as defined in claim 8, wherein each of the plurality of arc-shaped segmental bearings is formed of a plastic material, as a unitary component.

11. A thruster as defined in claim 1, and further comprising first and second nozzle assemblies secured to opposite sides of the stator body, encircling the circular opening.

12. A thruster as defined in claim 1, wherein each of the plurality of propeller blades is configured to be selectively removable from the rotor body.

13. A thruster for a submarine vessel comprising:

(a) a stator assembly including (1) a ring-shaped stator body encapsulating a plurality of coils, wherein the body defines a circular opening having a central axis, and wherein the coils are configured to create a variable electromagnetic field within the circular opening, and (2) at least one ring-shaped stator bearing secured to the stator body, encircling the circular opening and having a journal bearing surface and a thrust bearing surface;

(b) a rotor assembly including (1) a ring-shaped rotor body encapsulating a plurality of rotor magnets and located within the circular opening defined by the stator body, wherein the stator magnets are configured to create a magnetic field, (2) a plurality of propeller blades secured to the rotor body and arranged to project inwardly therefrom, and (3) at least one ring-shaped rotor bearing secured to the ring-shaped body, wherein the rotor bearing has journal and thrust bearing surfaces configured for bearing engagement with the respective journal and thrust bearing surfaces of the stator bearing;

(c) a controller for supplying electrical current to the coils of the stator assembly, to create a controlled electromagnetic field within the circular opening of the stator assembly, which interacts with the magnetic field of the rotor magnets, to cause the rotor assembly to rotate about the central axis; and (d) a centrifugal pump integrated with the rotor bearing, for directing filtered water past the stator bearings and the rotor bearings, to cool the bearings and the coils of the stator assembly.

14. A thruster as defined in claim 13, wherein:

the rotor bearing includes a planar wall oriented substantially perpendicular to the central axis; and the pump includes a plurality of radially oriented grooves formed in the planar wall of the rotor bearing, for slinging water radially outwardly when the rotor assembly is rotated about the central axis.

15. A thruster as defined in claim 14, wherein the pump further includes a plurality of holes formed through the planar wall of the rotor bearing, each such hole being aligned with a separate one of the plurality of grooves, for directing water to the grooves.

16. A thruster as defined in claim 13, wherein:

the pump provides suction that draws unfiltered sea water through a water inlet formed in the stator body; and the thruster further comprises a filter located between the water inlet and the pump.

17. A thruster as defined in claim 16, and further comprising a flapper valve located downstream of the pump, for preventing the intrusion of unfiltered sea water into the region of the stator bearing and rotor bearing when the rotor assembly is not rotating.

* * * * *